(12) United States Patent
Han

(10) Patent No.: US 10,263,439 B2
(45) Date of Patent: Apr. 16, 2019

(54) METHOD AND APPARATUS FOR PROTECTING BATTERY

(71) Applicant: SAMSUNG ELECTRONICS CO., LTD., Suwon-si, Gyeonggi-do (KR)

(72) Inventor: Ki-Wook Han, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 36 days.

(21) Appl. No.: 15/481,737

(22) Filed: Apr. 7, 2017

(65) Prior Publication Data

US 2017/0302090 A1 Oct. 19, 2017

(30) Foreign Application Priority Data

Apr. 14, 2016 (KR) .................. 10-2016-0045635

(51) Int. Cl.
*H02J 7/00* (2006.01)
*H01M 10/623* (2014.01)
(Continued)

(52) U.S. Cl.
CPC .......... *H02J 7/0031* (2013.01); *H01M 10/42* (2013.01); *H01M 10/4285* (2013.01); *H01M 10/443* (2013.01); *H01M 10/486* (2013.01); *H01M 10/623* (2015.04); *H01M 10/63* (2015.04); *H02J 7/0029* (2013.01); *H02J 7/0036* (2013.01); *H01M 2200/10* (2013.01); *H02J 2007/005* (2013.01)

(58) Field of Classification Search
CPC ...... H02J 7/0031; H02J 7/0029; H02J 7/0036; H01M 10/623; H01M 10/63; H01M 10/42; H01M 10/4285; H01M 10/443; H01M 10/486

USPC ......................................... 320/136
See application file for complete search history.

(56) References Cited

U.S. PATENT DOCUMENTS 5,341,503 A * 8/1994 Gladstein ........... G01R 31/3648
320/136
5,563,496 A * 10/1996 McClure ............... H02J 7/0081
320/128

(Continued)

FOREIGN PATENT DOCUMENTS

KR 10-2011-005837 6/2011

*Primary Examiner* — M Baye Diao
(74) *Attorney, Agent, or Firm* — Nixon & Vanderhye P.C.

(57) ABSTRACT

Various example embodiments of the present disclosure disclose a method and an apparatus for protecting a battery in an electronic device. According to various example embodiments of the present disclosure, the electronic device includes: a battery configured to supply power to the electronic device; a timer configured to maintain time information of the electronic device; a thermistor configured to measure a temperature of the battery; and a processor electrically connected with the battery, the timer, and the thermistor, and the processor is configured to: determine a state of the battery when the electronic device is powered off; cause the electronic device to enter a suspend mode to protect the battery based on a result of the determining; be woken up by the timer in a sleep state accompanied by entering of the suspend mode, and acquire state information of the battery; and perform a function related to battery protection of the battery based on the acquired state information.

19 Claims, 6 Drawing Sheets

(51) Int. Cl.
*H01M 10/63* (2014.01)
*H01M 10/42* (2006.01)
*H01M 10/44* (2006.01)
*H01M 10/48* (2006.01)

(56) References Cited

U.S. PATENT DOCUMENTS

| | | | | |
|---|---|---|---|---|
| 6,157,169 | A * | 12/2000 | Lee | G01R 19/16542 |
| | | | | 320/130 |
| 6,262,577 | B1 * | 7/2001 | Nakao | G01R 31/3651 |
| | | | | 320/135 |
| 6,456,041 | B1 * | 9/2002 | Terada | B60L 11/1861 |
| | | | | 320/132 |
| 6,810,290 | B2 * | 10/2004 | Lebel | A61N 1/37211 |
| | | | | 607/60 |
| 7,024,574 | B2 * | 4/2006 | Odaohhara | G06F 1/263 |
| | | | | 713/300 |
| 7,830,125 | B2 | 11/2010 | Ibrahim | |
| 9,225,185 | B2 | 12/2015 | Ham | |
| 9,680,334 | B2 * | 6/2017 | Toya | H02J 9/06 |
| 9,877,526 | B2 * | 1/2018 | Haas | A41D 13/0051 |
| 2011/0121787 | A1 | 5/2011 | Kim et al. | |
| 2013/0099757 | A1 * | 4/2013 | Ham | H02J 7/0047 |
| | | | | 320/150 |
| 2014/0045003 | A1 * | 2/2014 | Liu | H02J 7/0068 |
| | | | | 429/61 |
| 2016/0041230 | A1 * | 2/2016 | Yen | G06F 1/26 |
| | | | | 320/136 |
| 2018/0048016 | A1 * | 2/2018 | Chen | H01M 4/62 |

* cited by examiner

METHOD AND APPARATUS FOR PROTECTING BATTERY

CROSS REFERENCE TO RELATED APPLICATION

The present application is based on and claims priority under 35 U.S.C. § 119 to Korean Application Serial No. 10-2016-0045635, which was filed in the Korean Intellectual Property Office on Apr. 14, 2016, the content of which is incorporated by reference herein in its entirety.

BACKGROUND

1. Field of the Disclosure

The present disclosure relates generally to a method and an apparatus for protecting a battery in an electronic device.

2. Description of Related Art

With the recent enhancement of digital technology, various types of electronic devices, such as a mobile communication terminal, a smart phone, a tablet personal computer (PC), a notebook, a wearable device, a digital camera, a navigation device, or the like, are widely used.

Electronic devices include batteries which have high applicability according to a product group and have electric characteristics such as high energy density. Batteries may alternately perform charging and discharging, and electronic devices need to effectively control charging and discharging of batteries and manage batteries to keep appropriate operation state and performance.

For example, in general, batteries are vulnerable to safety issues and may cause safety accidents such as ignition, smoke, explosion, or the like due to their own problems even when they include safety devices using various electronic components. In addition, electronic devices using batteries may be exposed to problems such as a shock, overheating, overcharging, or a short circuit due to a using environment and users' behaviors. In such an environment, there may be occurrence of problems in the safety of batteries and ignition or explosion may be caused.

Swelling, which refers to a phenomenon in which a battery swells, may precede such a safety accident. Through this symptom, explosion or ignition of a battery may be detected in advance. Accordingly, the need to sense swelling of a battery arises and various sensing or detecting devices are being developed.

However, electronic devices may be provided with a separate sensing device for sensing battery swelling, and accordingly, there are problems that the prices of electronic devices increase and a space for installing the sensing device is additionally required and thus the volumes of electronic devices increase. In addition, related-art electronic devices cannot check the state of batteries (for example, a voltage, a temperature) in a power off state in which the electronic devices do not work. Accordingly, there is no related-art method for preventing battery swelling in the power off state of an electronic device, and a technique of preventing battery swelling using a separate sensing device, which is separate from the power source of an electronic device, is used.

SUMMARY

The present disclosure is provided to address the above-discussed deficiencies, and to provide at least the advantages described below. Accordingly, the present disclosure provides a method and an apparatus for protecting a battery in an electronic device.

Another example aspect of the present disclosure provides a method and an apparatus for protecting a battery by preventing and/or reducing battery swelling in advance.

Another example aspect of the present disclosure provides a method and an apparatus for preventing and/or reducing battery swelling in advance by detecting the state of a battery (for example, a voltage, a current, a temperature, or the like) without requiring an additional component even in a power off state of an electronic device.

Another example aspect of the present disclosure provides a method and an apparatus for protecting a battery through self-discharging of an electronic device when abnormality/normality of a battery is detected.

According to an example aspect of the present disclosure, an electronic device includes: a battery configured to supply power to the electronic device; a timer configured to maintain time information of the electronic device; a thermistor configured to measure a temperature of the battery; and a processor electrically connected with the battery, the timer, and the thermistor, and the processor is configured to: determine a state of the battery when the electronic device is powered off; to cause the electronic device to enter a suspend mode to protect the battery based on a result of the determining; be woken up by the timer in a sleep state accompanied by entering of the suspend mode, and acquire state information of the battery; and perform a function related to battery protection of the battery based on the state information.

According to another example aspect of the present disclosure, a method for operating of an electronic device includes: detecting power off of the electronic device; determining a state of a battery when the electronic device is powered off; entering a suspend mode for protecting the battery based on a result of the determining; waking up based on a predetermined operation period in a sleep state accompanied by entering of the suspend mode; acquiring state information of the battery in response to the waking up; and performing a function related to battery protection of the battery based on the state information.

According to another example aspect of the present disclosure, a computer readable recording medium has a program recorded thereon to execute the above-described method in a processor.

BRIEF DESCRIPTION OF THE DRAWINGS

The above aspects, features and attendant advantages of the present disclosure will be more readily understood and appreciated from the following detailed description, taken in conjunction with the accompanying drawings, in which like reference numerals refer to like elements, and wherein.

DETAILED DESCRIPTION

Figure 1:
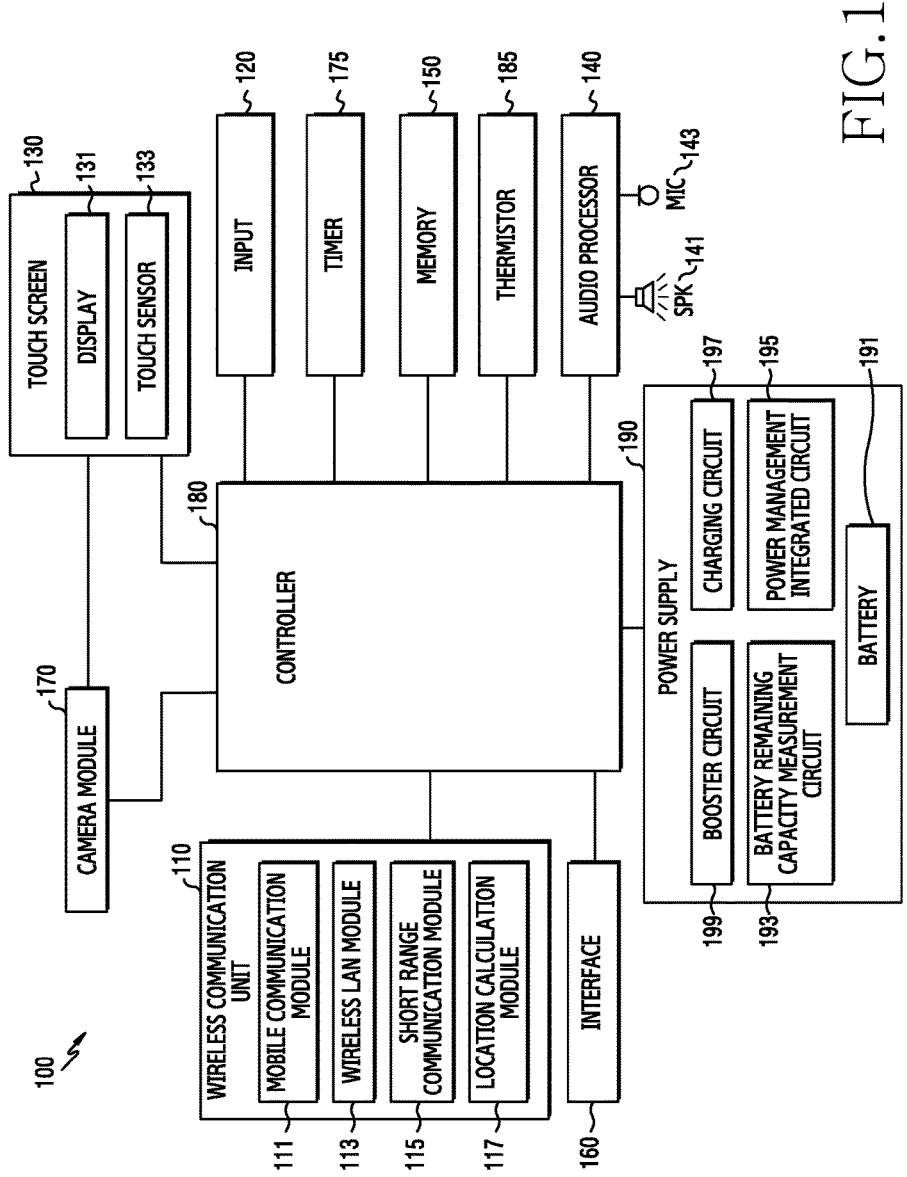
FIG. 1 is a block diagram illustrating an example configuration of an electronic device according to various example embodiments of the present disclosure.

Various example embodiments of the present disclosure will be described herein with reference to the accompanying drawings. However, example embodiments and terms used herein are not intended to limit the technical features described in the present disclosure to specific embodiments and should be understood as including modifications, equivalents and/or alternatives of example embodiments of the present disclosure. In the explanation of the drawings, similar reference numerals are used for similar elements. In addition, example embodiments of the present disclosure are provided for explanation and understanding of the technical features disclosed herein and do not limit the scope of the present disclosure. Accordingly, the scope of the present disclosure should be understood as including all changes based on the technical idea of the present disclosure or various other embodiments.

Various example embodiments of the present disclosure relate to an electronic device including a battery and a method for operating thereof. For example, various example embodiments of the present disclosure disclose a method and an apparatus for protecting a battery by preventing and/or reducing battery swelling in advance.

According to various example embodiments, an electronic device may include all kinds of devices using one or more of various processors, such as, for example, and without limitation, a dedicated processor, an application processor (AP), a communication processor (CP), a graphic processing unit (GPU), and a central processing unit (CPU), like all information and communication devices, multimedia devices, wearable devices, Internet of things (IoT) devices, and application devices therefore.

An electronic device according to various embodiments of the present disclosure may include at least one of, for example, smartphones, tablet personal computers (PCs), mobile phones, video telephones, electronic book readers, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, cameras, or wearable devices, or the like, but is not limited thereto. According to certain embodiments of the present disclosure, the electronic devices may include at least one of, for example, televisions (TVs), digital versatile disc (DVD) players, audios, refrigerators, air conditioners, cleaners, ovens, microwave ovens, washing machines, air cleaners, set-top boxes, home automation control panels, media boxes (e.g., Samsung HomeSync™, Apple TV™, or Google TV™), game consoles (e.g., Xbox™ and PlayStation™), electronic dictionaries, electronic keys, camcorders, or electronic picture frames, or the like, but is not limited thereto.

According to another embodiment, the electronic devices may include at least one of medical devices (e.g., various portable medical measurement devices (e.g., a blood glucose monitoring device, a heartbeat measuring device, a blood pressure measuring device, a body temperature measuring device, and the like)), navigation devices, global navigation satellite systems (GNSS), vehicle infotainment devices, electronic equipment for vessels (e.g., navigation systems and gyrocompasses), head units for vehicles, industrial or home robots, drones, points of sales (POSs), or internet of things (e.g., light bulbs, various sensors, sprinkler devices, fire alarms, thermostats, toasters, exercise equipment, heaters, boilers, and the like), or the like, but is not limited thereto. According to a certain embodiment, the electronic devices may include at least one of furniture, buildings/structures or a part of a car, electronic boards, electronic signature receiving devices, projectors, or various measuring instruments (e.g., water meters, electricity meters, gas meters, or wave meters, and the like), or the like, but is not limited thereto. The electronic devices according to various embodiments may be flexible or a combination of two or more of the above-mentioned devices. Electronic devices according to various embodiments of the present disclosure are not limited to the above-mentioned devices. The term "user" used in the various example embodiments may refer to a person who uses the electronic device or a device that uses the electronic device (for example, an artificial intelligence electronic device).

At least a portion of an apparatus (for example, modules or functions thereof) or a method (for example, operations) according to various embodiments may be implemented by instructions stored in a computer-readable recording media (for example, a memory) in the form of a programmable module. When the instruction is executed by a processor, the processor may perform a function corresponding to the instruction.

The computer-readable recording media may include a hard disk, a floppy disk, a magnetic media (for example, a magnetic tape), an optical recording media (for example, compact disc read only memory (CD-ROM), a digital versatile disc (DVD), a magneto-optical media (for example, a floptical disk)), and an internal memory. Also, the instruction may include a code generated by a compiler or a code executable by an interpreter. A module or a programming module according to various embodiments may include at least one of the above elements, or a portion of the above elements may be omitted, or additional other elements may be further included. Operations performed by a module, a programming module, or other elements according to various embodiments may be executed sequentially, in parallel, repeatedly, or in a heuristic method. Also, a portion of operations may be executed in different sequences, omitted, or other operations may be added.

Hereinafter, an operating method and an apparatus according to various example embodiments of the present disclosure will be described with reference to the accompanying drawings. However, since various example embodiments of the present disclosure are not restricted or limited by the following description, it should be noted that the present disclosure can be applied to various example embodiments based on the following embodiments. In various example embodiments described below, a hardware approach method will be described by way of an example. However, since various example embodiments of the present disclosure include technology which use both hardware and software, various example embodiments of the present disclosure do not exclude an approach method based on software.

FIG. 1 is a block diagram illustrating an example configuration of an electronic device according to various example embodiments of the present disclosure.

Referring to FIG. 1, the electronic device 100 according to various example embodiments may include, for example, a wireless communication unit (e.g., including communication circuitry) 110, an input (e.g., including input circuitry) 120, a touch screen 130, an audio processor 140, a memory 150, an interface (e.g., including interface circuitry) 160, a camera module 170, a timer 175, a thermistor 185, a controller 180 (for example, a processor/processing circuitry), and a power supply 190. According to various example embodiments of the present disclosure, the elements of the electronic device 100 illustrated in FIG. 1 are not essential and the electronic device 100 may include more elements than in FIG. 4 or may include fewer elements than in FIG. 4. For example, the electronic device 100 according to various example embodiments may not include some elements such as the wireless communication unit 110 or the camera module 170 according to its type.

The wireless communication unit 110 may include one or more modules for enabling wireless communication to be performed between the electronic device 100 and another external electronic device. For example, the wireless communication unit 110 may include various communication circuitry, such as, for example, and without limitation, a mobile communication module 111, a wireless local area network (WLAN) module 113, a short-range communication module 115, and a location calculation module 117. According to various example embodiments, the wireless communication unit 110 may include a module (for example, a short-range communication module, a long-range communication module, or the like) for communicating with a neighboring external electronic device.

The mobile communication module 111 may include, for example, a cellular module. The mobile communication module 111 may transmit and receive radio signals to and from at least one of a base station, an external electronic device, or various servers (for example, an application server, a management server, an integration server, a provider server, a content server, an internet server, a cloud server, or the like) on a mobile communication network. The radio signal may include a voice signal, a data signal, or various types of control signals. The mobile communication module 111 may transmit various data necessary for the operations of the electronic device 100 to an external electronic device in response to a user request.

The wireless LAN module 113 may refer, for example, to a module for wirelessly connecting to the Internet and forming a wireless LAN link with another external electronic device. The wireless LAN module 113 may be embedded inside or provided outside the electronic device 100. Wireless Internet technology may use wireless fidelity (WiFi), wireless broadband (Wibro), world interoperability for microwave access (WiMax), high speed downlink packet access (HSDPA), or millimeter wave (mmWave). The wireless LAN module 113 may transmit or receive various data of the electronic device 100 to or from an external electronic device by interworking with another external electronic device which is connected with the electronic device 100 via a network (for example, a wireless Internet network). The wireless LAN module 113 may always maintain an on state or may be turned on/off according to settings of the electronic device 100 or a user input.

The short-range communication module 115 may indicate a module for performing short range communication. The short-range communication technology may use Bluetooth, Bluetooth low energy (BLE), radio frequency identification (RFID), an infrared data association (IrDA), ultra wideband (UWB), ZigBee, near field communication (NFC), or the like. The short-range communication module 115 may transmit or receive various data of the electronic device 100 to or from an external electronic device by interworking with another external electronic device connected with the electronic device 100 via a network (for example, a short-range communication network). The short-range communication module 115 may maintain an on state or may be turned on/off according to settings of the electronic device 100 or a user input.

The location calculation module 117 is a module for acquiring the location of the electronic device 100, and may include a global positioning system (GPS) module as a representative example. The location calculation module 117 may measure the location of the electronic device 100 according to the principle of triangulation. The location information of the electronic device 100 may be acquired in various methods.

The input 120 may generate input data for controlling the operations of the electronic device 100 in response to an input, for example, a user input. The input 120 may include at least one input device for detecting user's various inputs. For example, the input 120 may include various input circuitry, such as, for example, and without limitation, a keypad, a dome switch, a physical button, a touch pad (resistive/capacitive), a jog & shuttle, and a sensor.

According to various example embodiments, a sensor (not shown) may measure, for example, a physical quantity or may detect an operation state of the electronic device 100 and may convert the measured or detected information to an electric signal. The sensor may include, for example, an iris scan sensor, a fingerprint scan sensor, an image sensor, or an illuminance sensor. In addition, the sensor may include at least one of a gesture sensor, a gyro sensor, a pressure sensor, a magnetic sensor, an acceleration sensor, a terrestrial sensor, a motion recognition sensor, a grip sensor, a proximity sensor, a color sensor (e.g., red, green, blue (RGB) sensor), a medical sensor, a temperature-humidity sensor, an ultra violet (UV) sensor, or a heart rate monitor (HRM) sensor. In addition, the sensor may include, for example, an E-nose sensor, an electromyography (EMG) sensor, an electroencephalogram (EEG) sensor, an electrocardiogram (ECG) sensor, or an infrared (IR) sensor.

The input 120 may have a part thereof implemented on the outside of the electronic device 100 in the form of a button, or a part or entirety of the input 120 may be implemented in the form of a touch panel. The input 120 may receive a user input for initiating the operations of the electronic device 100 (for example, a power on/off function, an audio reproduction function, a battery protection function or the like) according to various example embodiments, and generate an input signal according to a user input.

The touch screen 130 may refer, for example, to an input and output device for performing an input function and a display function, simultaneously, and may include a display 131 and a touch sensor 133. The touch screen 130 may provide an input and output interface between the electronic device 100 and the user, and may include a mediatory role of delivering a user's touch input to the electronic device 100 and displaying an output from the electronic device 100 for the user. The touch screen 130 may display a visual output for the user. The visual output may be displayed in the form of a text, graphics, a video, and a combination of these.

The display 131 may display (output) a variety of information processed in the electronic device 100. For example, the display 131 may display various user interfaces (UIs) or graphic user interfaces (GUIs) related to the use of the electronic device 100. The display 131 may use various displays. For example, the display 131 may include a liquid crystal display (LCD), a light-emitting diode (LED) display, an organic LED (OLED) display, a microelectromechanical systems (MEMS) display, or an electronic paper display, or the like, but is not limited thereto. Some displays may be implemented by using a transparent display configured in a transparent type or a photo-transparent type. According to various example embodiments, the display 131 may use a curved display (or a bended display).

The touch sensor 133 may be seated in the display 131, and may sense a user input which touches or approaches the surface of the touch screen 131. The user input may include a touch input or an approach input which is inputted based on at least one of a single touch, a multi-touch, hovering, or an air gesture. According to various example embodiments, the touch sensor 133 may receive a user input for initiating an operation related to the use of the electronic device 100, and generate an input signal according to a user input. The touch sensor 133 may be configured to convert a change in a pressure applied to a specific portion of the display 131 or a change in capacitance generated in a specific portion of the display 131 into an electric input signal. The touch sensor 133 may detect a location and an area of an input tool (for example, a user finger, an electronic pen, or the like) on the surface of the display 131 when the input tool touches or approaches the surface of the display 131. In addition, the touch sensor 133 may be implemented to detect a pressure when a touch is inputted in an applied touch method.

The audio processor 140 may include various circuitry configured to transmit an audio signal input from the controller 180 to a speaker (SPK) 141, and may forward an audio signal inputted from a microphone (MIC) 143, such as a voice, to the controller 180. The audio processor 140 may convert voice/sound data into an audible sound via the speaker 141 under the control of the controller 180, and output the audible sound, and may convert an audio signal received from the microphone 143 such as a voice into a digital signal, and forward the digital signal to the controller 180.

The speaker 141 may output audio data which is received from the wireless communication unit 110 or stored in the memory 150. The speaker 141 may output sound signals related to various operations (functions) performed in the electronic device 100.

The microphone 143 may receive a sound signal from the outside and process the sound signal into electric voice data. In the microphone 143, various noise reduction algorithms for removing a noise generated in the process of receiving a sound signal from the outside may be implemented. The microphone 143 may be in charge of inputting audio streaming such as a voice command.

The memory 150 may store one or more programs which are executed by the controller 180, and may perform a function of temporarily storing inputted/outputted data. The input/output data may include, for example, a file such as a video, an image, a photo, or an audio, and state information of a battery 191. The memory 150 may be in charge of storing acquired data, and may store data acquired on a real-time basis in a temporary storage device and may store data which is determined to be stored in a storage device which can store for long time.

According to various example embodiments, the memory 150 may store one or more programs, data, or instructions related to the controller 180 (for example, a processor) performing a battery protection operation for preventing battery swelling. According to various example embodiments, the memory 150 may store one or more programs, data, or instructions related to operations of: detecting a battery voltage when the electronic device 100 is powered off; operating the electronic device 100 (for example, a protection system) in a suspend mode according to the battery voltage; and performing a battery protection operation by waking up the protection system based on an operation period of the timer 175 in a sleep state of the protection system (for example, the controller 180, the timer 175, and the thermistor 185) accompanied by the suspend mode.

The memory 150 may include one or more application modules (or software modules). According to various example embodiments, the memory 150 may store one or more reference values for sensing a battery state. For example, the reference values related to battery sensing may include one or more reference values related to a battery level (for example, a voltage) and one or more reference values related to a battery temperature.

The interface 160 may receive data from another electronic device or receive power, and may forward data or power to the elements in the electronic device 100. The interface 160 may control internal data of the electronic device 100 to be transmitted to another electronic device. For example, the interface 160 may include various interface circuitry, such as, for example, and without limitation, a wire/wireless headphone port, an external charger port, a wire/wireless data port, a memory card port, an audio input/output port, a video input/output port, an earphone port, or the like.

The camera module 170 may refer, for example, to a configuration for supporting a photographing function of the electronic device 100. The camera module 170 may photograph a certain subject according to control of the controller 180 and may forward photographed data (for example, an image) to the display 131 and the controller 180.

The timer 175 may include a circuit for maintaining time information of the electronic device 100, for example, a real-time clock (RTC) (or an RTC circuit). The timer 175 may operate in a wake-up standby mode related to a battery protection operation under the control of the controller 180. The timer 175 may be woken up according to a predetermined operation period in the wake-up standby mode, and may transmit a wake-up signal for waking up the controller 180 and the thermistor 185 to the controller 180 and the thermistor 185 in response to being woken up. According to various example embodiments, the wake-up operation period of the timer 175 may be set to various values, such as 30 minutes, 1 hour, or the like, according to the state of the electronic device 100.

According to various example embodiments, the thermistor 185 may measure the temperature of the battery 191 and transmit temperature information to the controller 180 based on the result of the measuring. According to various example embodiments, the thermistor 185 may operate in a sleep state under the control of the controller 180 when the electronic device 100 is powered off. The thermistor 185 may be woken up in the sleep state in response to the wake-up signal of the controller 180 or the timer 175, and may measure a battery temperature in response to being woken up.

The controller 180 (for example, a processor including, for example, processing circuitry) may control the overall operations of the electronic device 100. According to various example embodiments, the controller 180 may include one or more processors or the controller 180 may be referred to as a processor. For example, the controller 180 may include, for example, and without limitation, a dedicated processor, a CPU, a communication processor (CP), an application processor (AP), an interface (for example, a general purpose input/output (GPIO)), or an internal memory as a separate element, or may be integrated into one or more integrated circuits. According to an example embodiment, the AP may perform various functions of the electronic device 100 by executing various software programs, and the CP may process and control voice communication and data communication. In addition, the controller 180 may execute a specific software module (for example, an instruction set) stored in the memory 150 to perform various specific functions corresponding to the module.

According to various example embodiments, the controller 180 may control a battery protection operation for preventing battery swelling. According to various example embodiments, the controller 180 may be electrically connected with the battery 191, the timer 175, and the thermistor 185 of the electronic device 100. According to various example embodiments, the controller 180 may detect a battery voltage when the electronic device 100 is powered off, may control the electronic device 100 (for example, a protection system) to operate in a suspend mode according to the battery voltage, and may be woken up based on the operation period of the timer 175 in a sleep state accompanied by the suspend mode and control the battery protection operation.

According to an example embodiment, the controller 180 may process an operation of detecting power off of the electronic device 100, an operation of determining the state of the battery 191 when the electronic device 100 is powered off, an operation of entering the suspend mode to protect the battery 191 based on the result of the determining, an operation of being woken up according to a predetermined operation period in the sleep state accompanied by the suspend mode, an operation of acquiring state information of the battery 191 in response to being woken up, and an operation of performing a function related to the protection of the battery 191 based on the state information.

According to various example embodiments, the controller 180 may control the operations of the hardware modules such as the audio processor 140, the interface 160, the display 131, the camera module 170, the timer 175, and the thermistor 185. According to various example embodiments, the control operation of the controller 180 will be described in detail with reference to the accompanying drawings.

The power supply 190 may receive external power or internal power under the control of the controller 180, and may supply power necessary for the operation of each element. According to various example embodiments of the present disclosure, the power supply 190 may supply power to or cut off the power supply to the wireless communication unit 110, the display 131, the camera module 170, the timer 175, the thermistor 185 or the like under the control of the controller 180.

According to various example embodiments, the power supply 190 may include, for example, a battery control circuit. For example, the power supply 190 may include the battery 191, a battery remaining capacity measurement circuit 193, a power management integrated circuit 195, a charging circuit 197, a booster circuit 199, or the like.

The battery 191 may be functionally or physically connected with the electronic device 100 via various interfaces. For example, the battery 191 may include a rechargeable battery and/or a solar battery.

The battery remaining capacity measurement circuit 193 (for example, a fuel gauge) may measure information of the battery 191. According to various example embodiment, the information of the battery 191 may include a remaining capacity, a voltage during a charge, a current, or a temperature. According to an example embodiment, the battery remaining capacity measurement circuit 193 may measure the information of the battery 191 based on a signal which is received via an electric path connected to the battery 191. According to various example embodiments, the battery remaining capacity measurement circuit 193 may provide the measured information of the battery 191 to the controller 180.

The power management integrated circuit 195 (for example, a PMIC) may manage power of the electronic device 100. The power management integrated circuit 195 may include a wire and/or wireless charging method. According to various example embodiments, the wireless charging method may include, for example, a magnetic resonant method, a magnetic induction method, or a microwave method, and may further include an additional circuit for wirelessly charging, for example, a coil loop, a resonant circuit, or a rectifier.

The charging circuit 197 may provide a voltage coming through the booster circuit 199 or an external device (for example, a charger) to at least one of the power management integrated circuit 195 and the battery 191.

The booster circuit 199 may be connected with the battery 191 to boost the voltage of the connected battery 191 and provide the voltage to the charging circuit 197.

As described above, the electronic device 100 according to various example embodiments may include the battery 191 to supply power to the electronic device 100; the timer 175 to maintain time information of the electronic device 100; the thermistor 185 to measure a temperature of the battery 191; and a processor (for example, the controller 180) electrically connected with the battery 191, the timer 175, and the thermistor 185. The processor 180 may: determine a state of the battery 191 when the electronic device 100 is powered off; cause the electronic device 100 to enter a suspend mode to protect the battery 191 based on a result of the determining; be woken up by the timer 175 in a sleep state accompanied by entering of the suspend mode, and acquire state information of the battery 191; and perform a function related to battery protection of the battery 191 based on the state information.

According to various example embodiments, the processor may be configured to control the timer to enter a wake-up standby mode in response to entering the suspend mode, and to change to the sleep state.

According to various example embodiments, the timer may be configured to: be woken up based on a predetermined operation mode in the wake-up standby mode; and, in response to being woken up, transmit wake-up signals for waking up the processor and the thermistor to the processor and the thermistor.

According to various example embodiments, the thermistor may be configured to: be woken up in response to the wake-up signal; measure the temperature of the battery in response to being woken up; and transmit temperature information to the processor based on a result of the measuring.

According to various example embodiments, the processor may be configured to: be woken up in response to the wake-up signal; acquire voltage information of the battery in response to being woken up; and determine the state of the battery based on the voltage information and the temperature information.

According to various example embodiments, the processor may be configured to perform a function related to the battery protection, the suspend mode, or power off of the electronic device based on a result of the determining.

According to various example embodiments, when the state of the battery indicates that a battery voltage is greater than or equal to a predetermined voltage and a battery temperature is lower than a predetermined temperature, the processor may be configured to control the timer to enter the wake-up standby mode.

According to various example embodiments, when the state of the battery indicates that a battery voltage is greater than or equal to a predetermined voltage and a battery temperature is higher than or equal to a predetermined temperature, the processor may be configured to perform self-discharging such that the voltage of the battery reaches a normal voltage, and, when the voltage of the battery is reduced to the normal voltage through the self-discharging, the processor may be configured to power off the electronic device.

According to various example embodiments, the processor may be configured to perform the self-discharging by consuming a minimum current which does not increase the temperature of the battery.

According to various example embodiments, when the state of the battery indicates that a battery voltage is less than a predetermined voltage, the processor may be configured to disable the wake-up standby mode of the timer and power off the electronic device.

According to various example embodiments, when charging of the electronic device is detected in a power off state of the electronic device, the processor may be configured to control to enter the suspend mode and perform a function related to battery protection of the battery.

Figure 2:
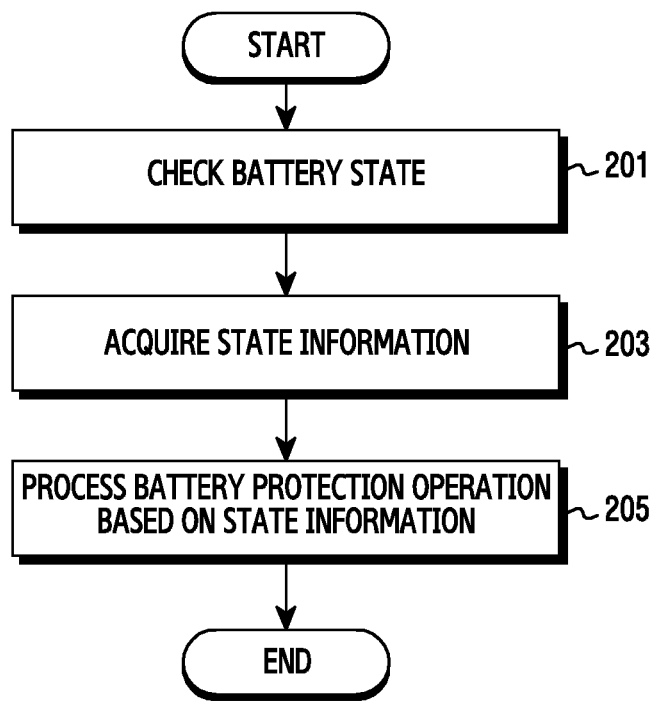
FIG. 2 is a flowchart illustrating an example method for operating of an electronic device according to various example embodiments of the present disclosure.

FIG. 2 is a flowchart illustrating an example method for operating of an electronic device according to various example embodiments of the present disclosure.

Referring to FIG. 2, in operation 201, the controller 180 (for example, a processor or an AP) of the electronic device 100 may check the state of the battery 191. According to various example embodiments, the state of the battery 191 may include a voltage (or a capacity), a current, a temperature or the like of the battery 191. The controller 180 may check the state of the battery according to a predetermined operation period in a state in which the electronic device 100 operates (for example, a power on state) or a state in which the electronic device 100 does not operate (for example, a power off state). According to various example embodiments, operations of the electronic device 100 monitoring the state of the battery in the power off state and protecting the battery 191 will be described in detail with reference to the accompanying drawings.

In operation 203, the controller 180 may acquire state information related to the battery 191 based on the checked battery state. For example, the controller 180 may acquire voltage information, temperature information, or the like of the battery 191 based on at least a part of voltage sensing, temperature sensing, or the like.

In operation 205, the controller 180 may process a battery protection operation based on the state information. For example, when a battery voltage of the battery 191 is higher than a predetermined reference at higher than a predetermined temperature based on the state information of the battery 191, the controller 180 may operate to reduce the voltage of the battery 191. According to an example embodiment, when the battery voltage is high at higher than a specific temperature, the controller 180 may perform an operation for discharging. According to an example embodiment, the controller 180 may continue monitoring the battery 191 at lower than the specific temperature even when the battery voltage is high. According to an example embodiment, when the battery voltage is lower than a predetermined voltage, the controller 180 may finish monitoring the battery 191. The operation of protecting the battery 191 based on the state information according to various example embodiments will be described in detail with reference to the accompanying drawings.

Figure 3:
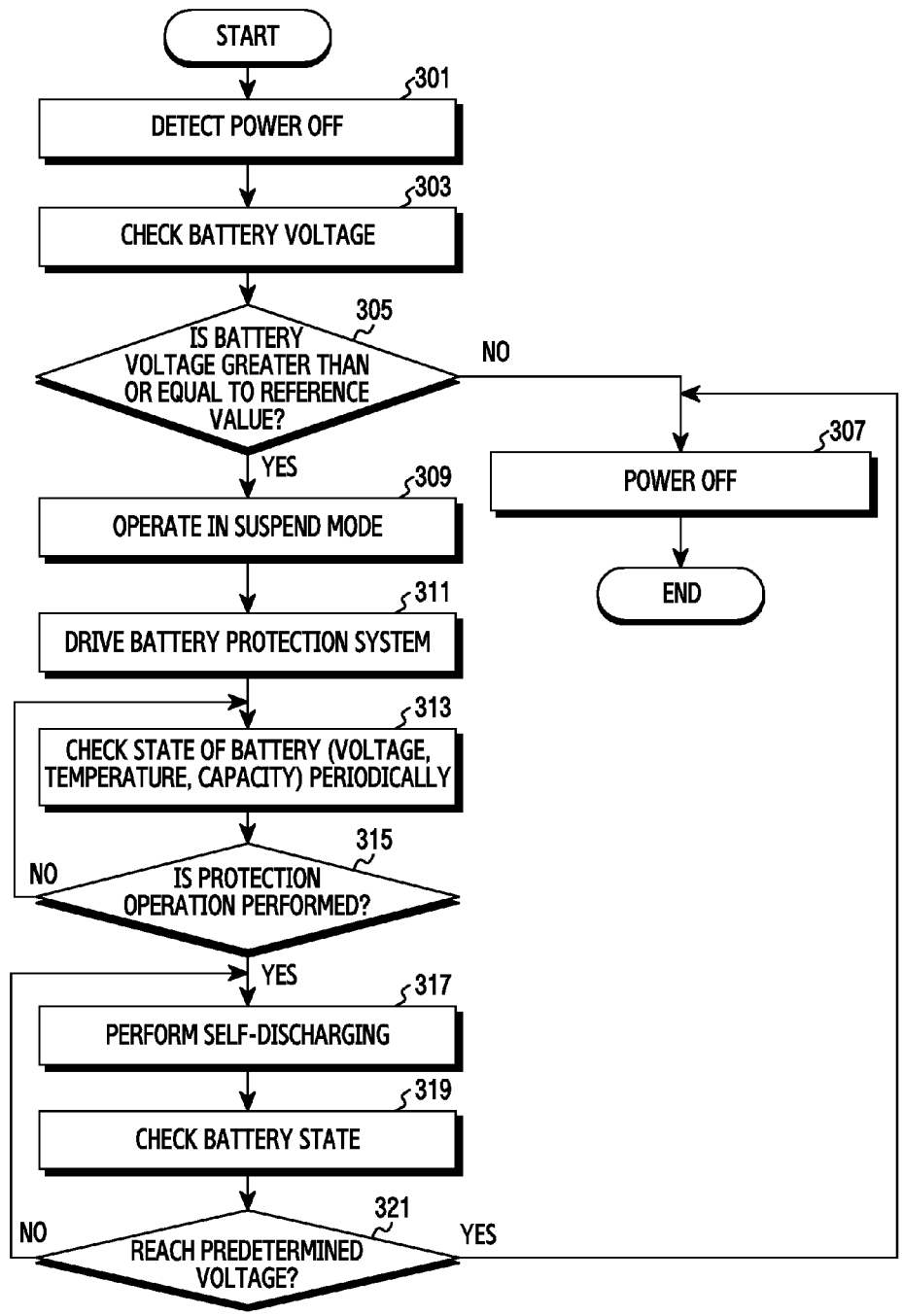
FIG. 3 is a flowchart illustrating an example method for performing a battery protection operation based on power off in an electronic device according to various example embodiments of the present disclosure.

FIG. 3 is a flowchart illustrating an example method for performing a battery protection operation based on power off in an electronic device according to various example embodiments of the present disclosure.

Referring to FIG. 3, in operation 301, the controller 180 (for example, a processor or an AP) of the electronic device 100 may detect power off of the electronic device 100. For example, the controller 180 may detect that the electronic device 100 enters a state (for example, power off) in which the electronic device 100 does not operate according to discharging of the electronic device 100 or a user input (for example, a power off input by a power button).

In operation 303, the controller 180 may check a battery state (for example, a voltage) when detecting the power off, and, in operation 305, the controller 180 may determine whether a battery voltage is greater than or equal to a predetermined reference value. In the example of FIG. 3, the voltage of the battery 191 is checked when the electronic device 100 is powered off. However, this should not be considered as limiting. For example, the controller 180 may check at least a part of a current, a voltage, or a temperature of the battery 191 and perform subsequent operations.

In operation 305, when the battery voltage is less than a predetermined voltage (for example, less than a reference value, for example, 4.25V) (No in operation 305), the controller 180 may process the power off of the electronic device 100 in operation 307.

In operation 305, when the battery voltage is greater than or equal to the predetermined voltage (for example, greater than or equal to the reference value, for example, 4.25V) (Yes in operation 305), the controller 180 may operate in a suspend mode (for example, a power saving (standby) mode) in operation 309. The suspend operation is described in various example embodiments by way of an example, but this should not be considered as limiting. The controller 180 may operate in a hibernate mode (for example, a maximum power saving or sleep mode). The suspend operation or hibernate operation in various example embodiments may indicate a power-saving and battery protection mode in the power off state, in which power supply to the elements of the electronic device 100 is cut off according to the power off operation of the electronic device 100, and only minimum power is supplied to a battery protection system (for example, the controller 180, the timer 175, and the thermistor 185) related to battery protection.

In operation 311, the controller 180 may control e.g., drive, the operations of the battery protection system. For example, the controller 180 may control in parallel or serially to change the sleep state or the wake-up state of at least one of the controller 180, the timer 175, or the thermistor 185. According to an example embodiment, the controller 180 may check the battery voltage, and, when the battery voltage is greater than or equal to a predetermined voltage, the controller 180 may control the timer 175 (for example, an RTC) to enter the standby mode and control the thermistor 185 to enter the sleep state, and then the controller 180 may enter the sleep state.

In operation 313, the controller 180 may periodically check the state of the battery 191. For example, the controller 180 may be woken up in the sleep state in response to a wake-up signal of the timer 175, and may check the state of the battery 191 (for example, a voltage, a current, a temperature, or the like). According to various example embodiments, the timer 175 may be woken up according to a predetermined period (for example, 10 minutes, 30 minutes, 1 hour, or the like) in the standby mode. According to an example embodiment, time may be required to make the temperature of the battery 191 increase to be higher than or equal to a battery protection temperature (for example, 60 degrees), and accordingly, the wake-up operation period of the timer 175 may be adjusted variously, for example, to 30 minutes, 1 hour, or the like, according to the state of the electronic device 100. A battery temperature (for example, a reference temperature) for determining in various example embodiments may be set to be lower than the battery protection temperature (for example, 60 degrees).

According to various example embodiments, the wake-up signal by the timer 175 may be transmitted to the thermistor 185 to wake up the thermistor 185. Alternatively, when the controller is woken up by the timer 175, the controller 180 may transmit a wake-up signal for waking up the thermistor 185 to the thermistor 185. When the thermistor 185 is woken up by the controller 180 or the timer 175, the thermistor 185 may sense the temperature of the battery 191 and transmit the sensed information to the controller 180. The controller 180 may identify the temperature of the battery 191 based on the sensed information of the thermistor 185. In addition, the controller 180 may identify the voltage (or a current or a capacity) of the battery 191 through the power supply 190 (for example, the battery remaining capacity measurement circuit 193 or the power management integrated circuit 195). According to various example embodiments, the timer 175 may enter the standby mode again after generating the wake-up signal, and the thermistor 185 may enter the sleep state after transmitting the sensed information.

In operation 315, the controller 180 may determine whether to perform a protection operation of protecting the battery 191 based on the checked state. For example, the controller 180 may determine whether to perform the battery protection operation based on state information (for example, voltage information, temperature information, or the like of the battery 191) related to the battery 191 based on the checked battery state. According to an example embodiment, when the battery voltage of the battery is greater than a predetermined reference at higher than a predetermined temperature, the controller 180 may determine to perform the battery protection operation. According to an example embodiment, when the battery voltage is high but the temperature of the battery is lower than a specific temperature, the controller 180 may determine not to perform the battery protection operation and may continue monitoring the battery 191 during the battery operation.

When the controller 180 determines not to perform the battery protection operation in operation 315 (No in operation 315), the controller 180 may resume operation 313 to process subsequent operations. According to various example embodiments, when the controller 180 does not perform the battery protection operation, the controller 180 may enter the sleep state. For example, the controller 180 may change the state from the wake-up state to the sleep state.

When the controller 180 determines to perform the battery protection operation in operation 315 (Yes in operation 315), the controller 180 may proceed to operation 317 to perform self-discharging. For example, the controller 180 may consume power in order to discharge the battery. According to various example embodiments, the controller 180 may consume a predetermined minimum amount of power in consideration of an increasing temperature of the battery 191.

In operation 319, the controller 180 may check the battery state while performing the self-discharging, and in operation 321, the controller 180 may determine whether the battery state reaches a predetermined voltage or not.

When it is determined that the battery state does not reach the predetermined voltage in operation 321 (No in operation 321), the controller 180 may resume operation 317 to perform subsequent operations.

When it is determined that the battery state reaches the predetermined voltage in operation 321 (Yes in operation 321), the controller 180 may proceed to operation 307 to process the power off of the electronic device 100. According to an example embodiment, the controller 180 may operate to reduce the voltage of the battery 191 to be less than a reference value (for example, 4.25V) by adjusting an amount of a current. According to an example embodiment, when the voltage of the battery 191 is less than or equal to a predetermined voltage (for example, 4.2V), the controller 180 may process the power off of the electronic device 100.

According to various example embodiments, the controller 180 may discharge the battery through self-discharging such that the battery voltage is less than a first reference value (for example, 4.25V) and is greater than or equal to a second reference value (for example, 4.2V). Thereafter, when the battery voltage is reduced to be less than or equal to the second reference value, the controller 180 may power off the electronic device 100 as in operation 307. According to various example embodiments, when the battery voltage is reduced to be less than or equal to a predetermined voltage, the controller 180 may finish monitoring the battery 191 according to the power off.

Figure 4:
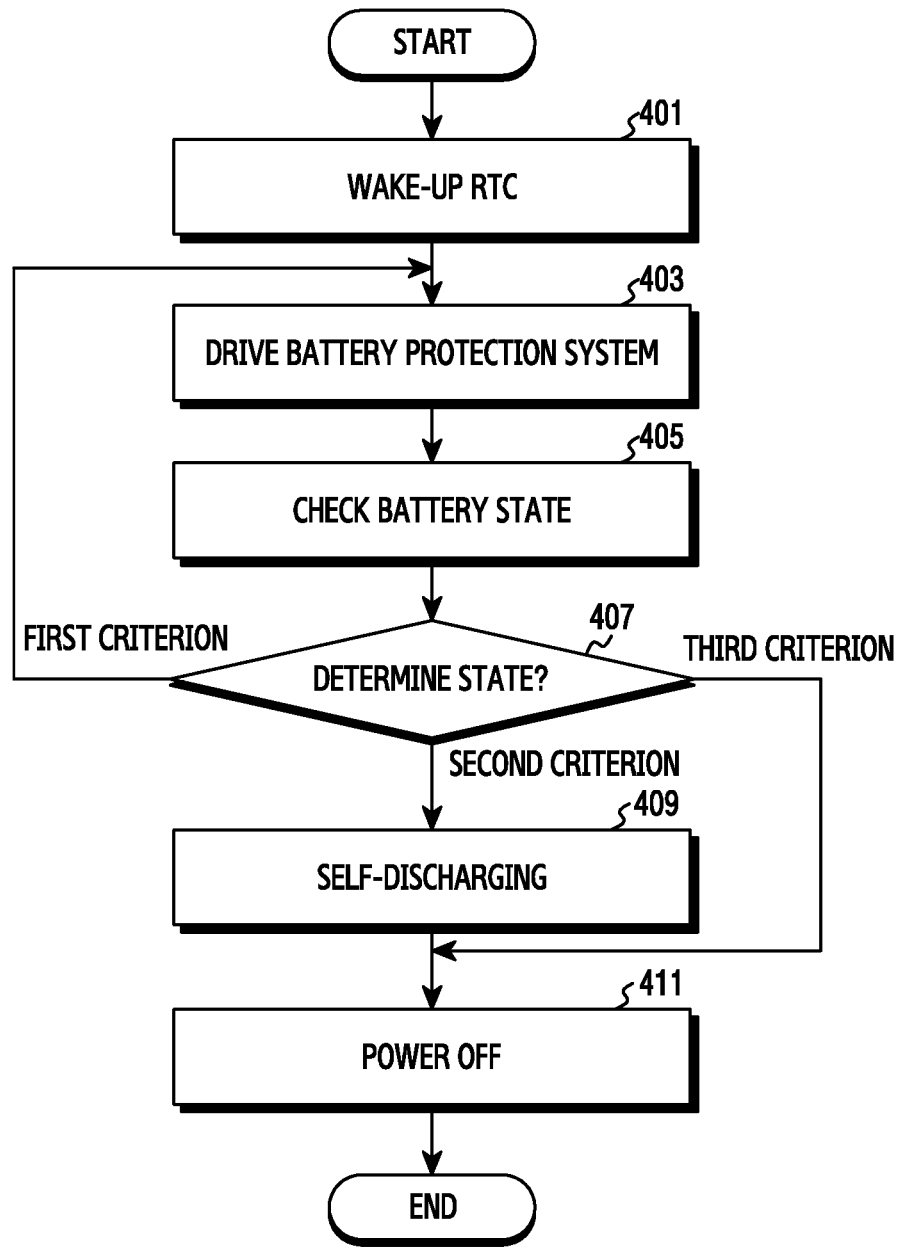
FIG. 4 is a flowchart illustrating an example method for performing a battery protection operation in a power off state of an electronic device according to various example embodiments of the present disclosure.

FIG. 4 is a flowchart illustrating an example method for performing a battery protection operation in a power off state in an electronic device according to various example embodiments of the present disclosure.

Referring to FIG. 4, in operation 401, the timer 175 (for example, the RTC) may be woken up. For example, the timer 175 may include an RTC or an RTC circuit for maintaining time information of the electronic device 100 when the electronic device 100 is powered off. According to various example embodiments, the timer 175 may be woken up according to a predetermined period (for example, a time) in a standby mode. For example, the timer 175 may be woken up according to a predetermined period (for example, 10 minutes, 30 minutes, 1 hour, or the like) in the standby mode.

In operation 403, the timer 175 may drive the battery protection system. For example, the timer 175 may transmit a wake-up signal for waking up the controller 180 (for example, a processor) to the controller 180 in response to being woken up, and the controller 180 may be woken up in response to the wake-up signal. According to an example embodiment, the timer 175 may transmit a wake-up signal for waking up the thermistor 185 to the thermistor 185 in response to being woken up. According to another example embodiment, the thermistor 185 may be woken up by the controller 180 rather than by the timer 175. For example, the controller 180 may transmit a wake-up signal for waking up the thermistor 185 to the thermistor 185 in response to being woken up by the timer 175.

In operation 405, the controller 180 may check the state of the battery 191 in response to being woken up. For example, the controller 180 may be woken up in the sleep state in response to the wake-up signal of the timer 175, and may check the state of the battery 191 (for example, a voltage, a current, a temperature, or the like). The thermistor 185 may sense the temperature of the battery 191 when being woken up by the controller 180 or the timer 175, and may transmit the sensed information to the controller 180. The controller 180 may identify the temperature of the battery 191 based on the sensed information of the thermistor 185. In addition, the controller 180 may identify the voltage (or a current or a capacity) of the battery 191 through the power supply 190 (for example, the battery remaining capacity measurement circuit 193 or the power management integrated circuit 195).

In operation 407, the controller 180 may determine the state of the battery 191 based on the checked state of the battery 191. For example, the controller 180 may determine whether the state of the battery 191 meets a first criterion, a second criterion, or a third criterion. The criteria related to the battery state in various example embodiments will be described with reference to table 1 presented below.

In operation 407, when it is determined that the battery state corresponds to the first criterion, the controller 180 may resume operation 403 to perform subsequent operations. For example, when the battery voltage is greater than or equal to a predetermined voltage and the battery temperature is lower than a predetermined temperature, the controller 180 may control the timer 175 to enter the wake-up standby mode in order to periodically monitor the state of the battery.

In operation 407, when it is determined that the battery state corresponds to the second criterion, the controller 180 may perform self-discharging in operation 409. For example, when the battery voltage is greater than or equal to the predetermined voltage and the battery temperature is higher than or equal to the predetermined temperature, the controller 180 may perform self-discharging so as to reduce the voltage of the battery 191 to fall within a normal range (or a stable range). According to an example embodiment, the self-discharging may include a discharging operation by an internal operation (or processing) of the controller 180, and may be performed by consuming a minimum current which does not increase the battery temperature. According to various example embodiments, the controller 180 may operate to reduce the battery voltage to a predetermined normal voltage (for example, 4.2 V) when performing the self-discharging. Thereafter, in operation 411, the controller 180 may control the power off of the electronic device 100. For example, the controller 180 may measure the battery voltage during the self-discharging, and, when the battery voltage is reduced to the normal voltage according to the self-discharging, the controller 180 may control the power off of the electronic device 100.

In operation 407, when it is determined that the battery state corresponds to the third criterion, the controller 180 may control the power off of the electronic device 100 in operation 411. For example, when the battery voltage is less than the predetermined voltage, the controller 180 may disable the wake-up standby mode of the timer 175 and may control the power off of the electronic device 100. According to various example embodiments, when the battery voltage is less than the predetermined voltage, battery swelling may not occur. Accordingly, when the battery voltage is less than the predetermined voltage, the controller 180 may disable the wake-up standby mode of the timer 175 for periodically monitoring the battery state regardless of the battery temperature, and may directly power off.

Table 1 presented below shows examples of the first criterion, the second criterion, and the third criterion according to various example embodiments.

TABLE 1

|  | First criterion | Second criterion | Third criterion |
| --- | --- | --- | --- |
| Voltage (Current) | Greater than or equal to a reference voltage | Greater than or equal to a reference voltage | Less than a reference voltage |
| Temperature | Lower than a reference temperature | Higher than or equal to a reference temperature | X |

Referring to table 1, according to various example embodiments, the reference voltage, which is a battery charging voltage (or a battery level), may indicate a fully charged voltage (for example, 4.25V) (or a battery level of 100%). According to an example embodiment, when the battery of the electronic device 100 is completely charged, the battery voltage may be 4.25V. When the battery voltage is measured as being greater than or equal to 4.25V, an overcharge may be caused. In general, the normal range (a normal voltage, a stable voltage) of the battery voltage may be 4.2 V. According to various example embodiments, the reference voltage may be set variously in the electronic device 100 to protect the battery. For example, the reference voltage may be set to various values, such as 4.25V, 4.2V, or 4V.

According to various example embodiments, the reference temperature may indicate a heating temperature of the battery 191, and may be set variously in the electronic device 100. For example, the reference temperature may be set to various values, such as 40 degrees, 45 degrees, or 50 degrees. According to various example embodiments, the reference temperature may be set according to the state of the electronic device 100 or a surrounding environment. For example, the reference temperature may be set to be lower than a battery protection temperature (for example, 60 degrees) (for example, 40 degrees, 45 degrees, or the like).

As shown in table 1, according to various example embodiments, the first criterion may include a state (or a condition) in which the battery voltage is greater than or equal to the reference voltage (for example, 4.25V) and the battery temperature is lower than the reference temperature (for example, 40 degrees). According to various example embodiments, the second criterion may include a state (or a condition) in which the battery voltage is greater than or equal to the reference voltage (for example, 4.25V) and the battery temperature is higher than or equal to the reference temperature (for example, 40 degrees). According to various example embodiments, the third criterion may include a state (or a condition) in which the battery voltage is less than the reference voltage (for example, 4.25V).

Figure 5:
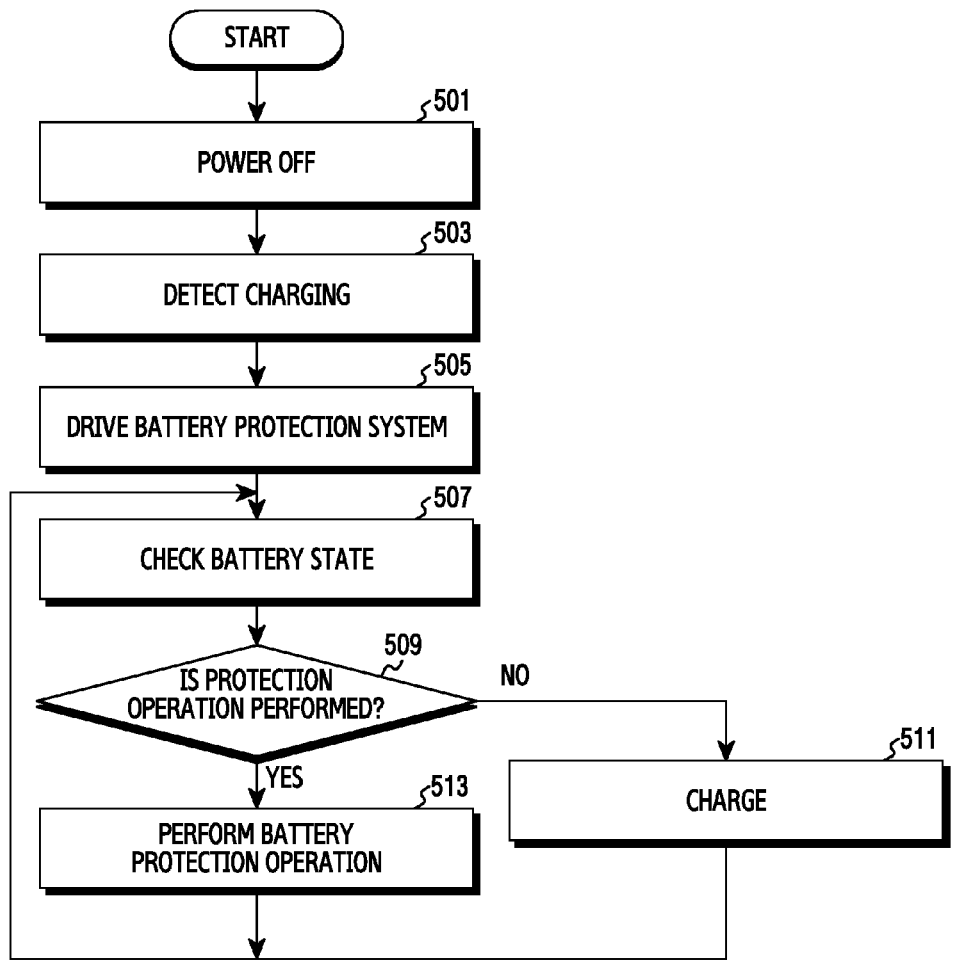
FIG. 5 is a flowchart illustrating an example battery protection operation during a charging operation in a power off state of an electronic device according to various example embodiments of the present disclosure.

FIG. 5 is a flowchart illustrating an example battery protection operation during a charging operation in a power off state of an electronic device according to various example embodiments of the present disclosure.

Referring to FIG. 5, in operation 501, the electronic device 100 may be powered off, and in operation 503, the controller 180 may detect charging. For example, in the power off state of the electronic device 100, the controller 180 may be woken up in response to a charging voltage being supplied according to wire charging or wireless charging. The controller 180 may perform charging detection and a charging mode for charging the battery 191 in response to being woken up. According to various example embodiments, when the wire charging or wireless charging is initiated, the charging operation may be performed based on the power supply 190.

In operation 505, the controller 180 may drive the battery protection system in response to being woken up. For example, the controller 180 may transmit a wake-up signal for waking up the thermistor 185 to the thermistor 185, and may control the timer 175 to enter the wake-up standby mode.

In operation 507, the controller 180 may check the state of the battery 191. For example, the controller 180 may check the state of the battery 191 (for example, a voltage, a current, a temperature, or the like).

In operation 509, the controller 180 may determine whether to perform a protection operation for protecting the battery 191 based on the checked state of the battery 191. For example, the controller 180 may determine whether to perform the battery protection operation based on state information (for example, voltage information, temperature information, or the like of the battery 191) related to the battery 191 based on the checked battery state. According to an example embodiment, when the battery voltage is greater than a predetermined reference at higher than a predetermined temperature, the controller 180 may determine to perform the battery protection operation. According to an example embodiment, when the battery voltage is high but the battery temperature is lower than a specific temperature, the controller 180 may determine not to perform the battery protection operation, and may continue monitoring the battery 191 during the battery operation.

When it is determined that the battery protection operation is not performed in operation 509 (No in operation 509), the controller 180 may proceed to operation 511 to perform charging. For example, the controller 180 may control the charging mode and may resume operation 507 to periodically check the state of the battery to perform the battery protection operation.

When it is determined that the battery protection operation is performed in operation 509 (Yes in operation 509), the controller 180 may proceed to operation 513 to perform the battery protection operation. For example, the controller 180 may cut off a voltage supplied by wire charging or wireless charging and may perform self-discharging. According to an example embodiment, the controller 180 may consume power to discharge the battery. According to an example embodiment, the controller 180 may perform the battery protection operation and resume operation 507 to process subsequent operations.

Figure 6:
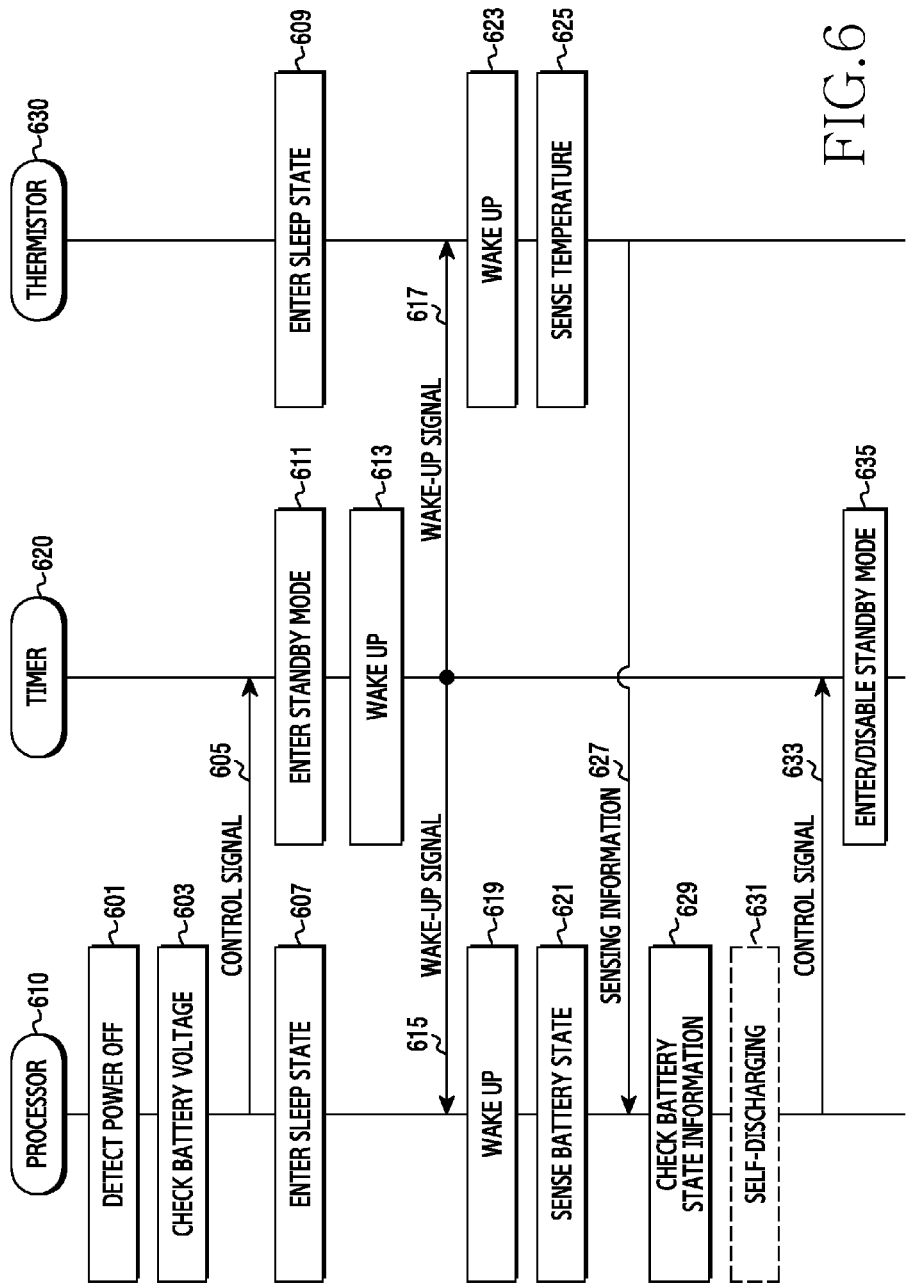
FIG. 6 is a signal flowchart illustrating an example battery protection operation in an electronic device according to various example embodiments of the present disclosure.

FIG. 6 is a signal flowchart illustrating an example battery protection operation in an electronic device according to various example embodiments of the present disclosure.

Referring to FIG. 6, the electronic device 100 may include a processor 610 (for example, the controller 180 of FIG. 1), a timer 620 (for example, the timer 175 of FIG. 1), and a thermistor 630 (for example, the thermistor 185 of FIG. 1) as a battery protection system.

In operation 601, the processor 610 may detect power off of the electronic device 100. For example, the processor 610 may detect that the electronic device 100 enters a state in which the electronic device 100 does not operate.

In operation 603, the processor 610 may check a battery state (for example, a battery voltage) when detecting the power off of the electronic device 100. For example, the processor 610 may determine whether the battery voltage is greater than or equal to a predetermined reference voltage or less than the predetermined reference voltage. According to various example embodiments, the processor 610 may proceed with powering off the electronic device 100 when the battery voltage is detected as being less than the reference voltage.

In operation 605, when the battery voltage is detected as being greater than or equal to the reference voltage, the processor 610 may transmit, to the timer 620, a control signal for controlling the timer 620 to enter a wake-up standby mode 611.

In operations 607 and 609, the processor 610 and the thermistor 630 may enter a sleep state. For example, the processor 610 and the thermistor 630 may enter the sleep state in response to the electronic device 100 entering the power off state.

In operation 611, the timer 620 may enter the wake-up standby mode to perform a battery protection operation in response to the control signal of the processor 610.

In operation 613, the timer 620 may be woken up in the wake-up standby mode. For example, the timer 620 may be periodically woken up according to a predetermined period (for example, 10 minutes, 30 minutes, 1 hours, or the like) in the standby mode. The wake-up operation period of the timer 620 may be set variously according to the state of the electronic device 100.

In operations 615 and 617, the timer 620 may transmit wake-up signals for waking up the processor 610 and the thermistor 630 to the processor 610 and the thermistor 630 serially or in parallel. According to various example embodiments, the thermistor 630 may be woken up by the processor 610 although not shown. For example, the timer 620 may transmit the wake-up signal to the processor 610 to wake up the processor 610, and, after being woken up by the timer 620, the processor 610 may transmit the wake-up signal for waking up the thermistor 630 to the thermistor 630.

In operation 619, the processor 610 may be woken up in response to the wake-up signal, and, in operation 621, the processor 610 may sense the battery state. For example, the processor 610 may acquire sensing information (for example, voltage information) corresponding to the battery voltage.

In operation 623, the thermistor 630 may be woken up in response to the wake-up signal, and in operation 625, the thermistor 630 may sense the battery state. For example, the thermistor 630 may measure a battery temperature.

In operation 627, the thermistor 630 may transmit sensing information (for example, temperature information) acquired by sensing the battery temperature to the processor 610.

In operation 629, the processor 610 may check battery state information. For example, the processor 610 may check the battery state information based on the voltage information regarding the battery voltage and the temperature information regarding the battery temperature. According to various example embodiments, the processor 610 may determine whether the state of the battery 191 meets the first criterion, the second criterion, or the third criterion based on the battery state information.

According to an example embodiment, when it is determined that the battery state corresponds to the first criterion (for example, the battery voltage is greater than or equal to a predetermined voltage and the battery temperature is lower than a predetermined temperature), in operation 633, the processor 610 may transmit, to the timer 620, a control signal for controlling the timer 620 to enter the wake-up standby mode to periodically monitor the battery state. In operation 635, the timer 620 may enter the standby mode in response to the control signal. Thereafter, the electronic device 100 may operate in a suspend mode to perform the battery protection operation according to a predetermined period. According to various example embodiments, when the battery state corresponds to the first criterion, the processor 610 may not perform a self-discharging operation.

According to an example embodiment, when it is determined that the battery state correspond to the second criterion (for example, the battery voltage is greater than or equal to the predetermined voltage and the battery temperature is higher than or equal to the predetermined temperature), in operation 631, the processor 610 may perform self-discharging so as to reduce the voltage of the battery 191 to a voltage of a normal range (or a stable range). In operation 633, the processor 610 may transmit, to the timer 620, a control signal for disabling the wake-up standby mode of the timer 620. In operation 635, the timer 620 may disable the standby mode in response to the control signal. For example, the processor 610 may measure the battery voltage during self-discharging, and, when the battery voltage is reduced to the normal voltage through self-discharging, the processor 610 may control the power off of the electronic device 100. Thereafter, the electronic device 100 may be powered off.

According to an example embodiment, when the battery state corresponds to the third criterion (for example, the battery voltage is less than the predetermined voltage), in operation 633, the processor 610 may transmit, to the timer 620, a control signal for disabling the wake-up standby mode of the timer 620. The timer 620 may disable the standby mode in response to the control signal. Thereafter, the electronic device 100 may be powered off.

As described above, the electronic device 100 according to various example embodiments may include the operations of: detecting power off of the electronic device 100; determining a state of the battery 191 when the electronic device 100 is powered off; entering a suspend mode for protecting the battery 191 based on a result of the determining; waking up according to a predetermined operation period in a sleep state accompanied by entering of the suspend mode; acquiring state information of the battery 191 in response to the waking up; and performing a function related to battery protection of the battery 191 based on the state information.

According to various example embodiments, the operation of entering the suspend mode may include the operations of: controlling the timer of the electronic device to enter a wake-up standby mode in response to entering the suspend mode; and changing to the sleep state.

According to various example embodiments, the operation of waking up may include an operation of waking up the processor and the thermistor of the electronic device according to an operation period of the timer in the sleep state.

According to various example embodiments, the operation of acquiring the state information may include the operations of: transmitting, by the thermistor, temperature information of the battery to the processor in response to the waking up; acquiring, by the processor, voltage information of the battery in response to the waking up; and determining, by the processor, the state of the battery based on the voltage information and the temperature information.

According to various example embodiments, the operation of performing the function may include an operation of performing a function related to the battery protection, the suspend mode, or the power off of the electronic device based on a result of the determining.

According to various example embodiments, the operation of performing the function may include an operation of, when the state of the battery indicates that a battery voltage is greater than or equal to a predetermined voltage and a battery temperature is lower than a predetermined temperature, controlling the timer to enter the wake-up standby mode.

According to various example embodiments, the operation of performing the function may include the operations of: when the state of the battery indicates that a battery voltage is greater than or equal to a predetermined voltage and a battery temperature is higher than or equal to a predetermined temperature, performing self-discharging such that the voltage of the battery reaches a normal voltage; and when the battery voltage is reduced to the normal voltage through the self-discharging, powering off the electronic device, and the self-discharging may include performing self-discharging by consuming a minimum current which does not increase the temperature of the battery.

According to various example embodiments, the operation of performing the function may include an operation of, when the state of the battery indicates that a battery voltage is less than a predetermined voltage, disabling the wake-up standby mode of the timer and powering off the electronic device.

According to various example embodiments, the operation of performing the function may include an operation of, when charging of the electronic device is detected in a power off state of the electronic device, performing a function related to battery protection of the battery accompanied by entering the suspend mode.

According to the electronic device and the method for operating thereof according to various example embodiments as described above, battery swelling can be prevented in advance without installing an additional circuit (or component) in the electronic device. Accordingly, the volume of the electronic device (or housing) can be minimized, and the battery swelling can be prevented in advance stably and rapidly in a narrower space and thus the battery can be protected.

According to various example embodiments, the electronic device can continuously monitor the state of the battery (for example, a voltage, a current, a temperature, or the like) without requiring an additional circuit (component) in the electronic device even when the electronic device is in the power off state. According to various example embodiments, the electronic device can protect the battery from increasing to a high temperature through self-discharging when abnormality of the battery is detected in the power off state of the electronic device. According to various example embodiments, by preventing and/or reducing swelling of the battery in advance, the usability, convenience, stability, and competitiveness of the electronic device can be enhanced.

While various example embodiments have been described in the present disclosure, various changes can be made within a limit without departing from the scope of the present disclosure. Therefore, the scope of the present disclosure should not be limited to and defined by the above-described example embodiments, and should be defined not only by the appended claims but also by the equivalents to the scopes of the claims.

What is claimed is:
1. An electronic device comprising:
   a battery configured to supply power to the electronic device;
   a timer configured to maintain time information of the electronic device;
   a thermistor configured to measure a temperature of the battery; and
   a processor electrically connected with the battery, the timer, and the thermistor, the processor configured to:

identify a battery voltage regarding the battery in response to an input for powering off the electronic device;

enter a sleep state, based on the identified battery voltage;

identify a state of the battery, after the processor is woken up in response to a wake-up signal received from the timer, the state of the battery including a battery voltage and the battery temperature of the battery; and perform a self-discharging, when the battery voltage is greater than or equal to a predetermined voltage and the battery temperature is higher than or equal to a predetermined temperature.

2. The electronic device of claim 1, wherein the processor is further configured to control the timer to enter a wake-up standby mode, based on the identified battery voltage.

3. The electronic device of claim 2, wherein the timer is configured to:

be woken up based on a predetermined operation mode in the wake-up standby mode; and transmit wake-up signals to the thermistor and the processor to wake up the processor and the thermistor in response to being woken up.

4. The electronic device of claim 3, wherein the thermistor is configured to:

be woken up in response to the wake-up signal;

measure the battery temperature in response to being woken up; and transmit measured battery temperature information to the processor.

5. The electronic device of claim 1, wherein the processor is configured to perform a function related to one or more of: battery protection, a suspend mode, or a power off of the electronic device, based on the state of the battery.

6. The electronic device of claim 1, wherein, when the battery voltage is greater than or equal to the predetermined voltage and the battery temperature is lower than the predetermined temperature, the processor is configured to control the timer to enter a wake-up standby mode.

7. The electronic device of claim 1, wherein the processor is configured to perform the self-discharging until the voltage of the battery reaches a normal voltage, and wherein, when the voltage of the battery is reduced to the normal voltage through the self-discharging, the processor is configured to power off the electronic device.

8. The electronic device of claim 7, wherein the processor is configured to perform the self-discharging by consuming a minimum current which does not increase the temperature of the battery.

9. The electronic device of claim 1, wherein, when the battery voltage is less than the predetermined voltage, the processor is configured to disable a wake-up standby mode of the timer and to power off the electronic device.

10. The electronic device of claim 1, wherein, when charging of the electronic device is detected in a power off state of the electronic device, the processor is configured to cause the electronic device to enter a suspend mode and to perform a function related to a battery protection of the battery.

11. A method of operating of an electronic device, the method comprising:

identifying, by a processor of the electronic device, a battery voltage of the electronic device in response to an input for powering off the electronic device;

controlling the processor to enter a sleep state, based on the identified battery voltage;

identifying a state of the battery after the processor is woken up in response to a wake-up signal received from a timer of the electronic device, the state of the battery including the battery voltage and a battery temperature of the battery; and performing self-discharging of the processor when the battery voltage is greater than or equal to a predetermined voltage and the battery temperature is higher than or equal to a predetermined temperature.

12. The method of claim 11, further comprising:

controlling the timer to enter a wake-up standby mode, based on the identified battery voltage.

13. The method of claim 12, further comprising waking up, by the timer, the processor and a thermistor of the electronic device, based on an operation period of the timer.

14. The method of claim 13, wherein identifying the state of the battery further comprises:

acquiring, by the processor, the battery temperature from a power supply of the electronic device; and acquiring, by the processor, the battery temperature from the thermistor.

15. The method of claim 14, further comprising performing a function related to one or more of: a battery protection, a suspend mode, or a power off of the electronic device, based on the state of the battery.

16. The method of claim 15, wherein performing the self-discharging of the processor comprises:

performing the self-discharging until the voltage of the battery reaches a normal voltage; and when the battery voltage is reduced to the normal voltage through the self-discharging, powering off the electronic device, wherein performing the self-discharging comprises performing self-discharging by consuming a minimum current which does not increase the temperature of the battery.

17. The method of claim 11, further comprising, when the battery voltage is greater than or equal to the predetermined voltage and the battery temperature is lower than a predetermined temperature, controlling the timer to enter a wake-up standby mode.

18. The method of claim 11, further comprising, when the battery voltage is less than the predetermined voltage, disabling a wake-up standby mode of the timer and powering off the electronic device.

19. The method of claim 11, further comprising, when charging of the electronic device is detected in a power off state of the electronic device, performing a function related to a battery protection of the battery.

* * * * *